United States Patent [19]

Ukai et al.

[11] Patent Number: 5,086,347
[45] Date of Patent: Feb. 4, 1992

[54] LIQUID CRYSTAL DISPLAY DEVICE HAVING METALLIC BUS REPAIR LAYER

[75] Inventors: Yasuhiro Ukai; Tomihisa Sunata; Teizo Yukawa, all of Kobe, Japan

[73] Assignee: Hosiden Electronics Co., Ltd., Osaka, Japan

[21] Appl. No.: 446,849

[22] Filed: Dec. 6, 1989

[30] Foreign Application Priority Data

Dec. 12, 1988 [JP] Japan .................. 63-314468

[51] Int. Cl.$^5$ ................................................ G02F 1/13
[52] U.S. Cl. .......................................... 359/87; 359/54
[58] Field of Search ..................... 350/332, 333–336

[56] References Cited

U.S. PATENT DOCUMENTS

| | | | |
|---|---|---|---|
| 4,630,355 | 12/1986 | Johnson | 350/333 |
| 4,688,896 | 8/1987 | Castleberry | 350/333 |
| 4,689,116 | 8/1987 | Coissard et al. | 350/333 |
| 4,840,459 | 6/1989 | Strong | 350/336 |
| 4,902,638 | 2/1990 | Muto | 357/41 |

Primary Examiner—Rolf Hille
Assistant Examiner—S. V. Clark
Attorney, Agent, or Firm—Pollock, Vande Sande and Priddy

[57] ABSTRACT

In an active matrix liquid crystal display device in which source and gate buses are arranged in a matrix form, thin film transistors are provided at intersections of the source and gate buses and display electrodes are driven by applying voltage thereto via the thin film transistors, source and gate bus repair conductive layers are provided which extend along the source buses in opposing relation thereto across an insulating layer. When any one of the source or gate buses is broken, the repair conductive layer and the broken bus can be connected at both side of the broken portion by laser welding.

12 Claims, 4 Drawing Sheets

LIQUID CRYSTAL DISPLAY DEVICE HAVING METALLIC BUS REPAIR LAYER

BACKGROUND OF THE INVENTION

The present invention relates to an active matrix liquid crystal display device which has a wide active or display area and provides a high resolution display.

A conventional liquid crystal display device of this kind has such a construction as shown in FIG. 1, wherein a pair of opposed transparent base plates 11 and 12 as of glass are separated by a spacer 13 interposed therebetween along their marginal portions, and liquid crystal 14 is sealed in the space between the transparent base plates 11 and 12.

The transparent base plate 11 has on its inside a plurality of display electrodes 15 and thin film transistors 16 formed as switching elements in contact therewith and having their drains connected thereto. On the inside of the other transparent base plate 12 there is formed a transparent common electrode 17 opposite the display electrodes 15 across the liquid crystal 14.

The display electrodes 15 are, for example, pixel electrodes. As depicted in FIG. 2, the transparent base plate 11 has square display electrodes 15 closely arranged in a matrix form and gate and source buses 18 and 19 formed close to and extending along the electrode arrays in the row and column directions, respectively. At the intersections of the gate and source buses 18 and 19 there are disposed the thin film transistors 16, which have their gates and sources connected to the gate and source buses 18 and 19 at their intersections and have their drains connected to the display electrodes 15.

When voltage is applied across selected ones of the gate and source buses 18 and 19, only the associated thin film transistor 16 is turned ON to store charges in the display electrode 15 connected to its drain, applying voltage across only that portion of the liquid crystal 14 sandwiched between the activated display electrode 15 and the common electrode 17. As a result of this, only that portion of the liquid crystal display corresponding to the display electrode 15 is rendered transparent or nontransparent to light, thus providing a selective display. The display can be erased simply by discharging the charges stored in the display electrode 15.

FIGS. 3 and 4 show a prior art example of the thin film transistor 16. On the transparent base plate 11 the display electrode 15 and the source bus 19 are each formed by a transparent conductive film as of ITO and a semiconductor layer 22 as of amorphous silicon is deposited which bridges the gap between the display electrode 15 and the source bus 19 along their parallel-opposed marginal edges. The semiconductor layer 22 is covered with a gate insulating film 23 as of silicon nitride almost all over the base plate 11. Consequently, the gate insulating film 23 is common to all the thin film transistors 16. On the gate insulating film 23 there is deposited a gate electrode 24 which overlaps the display electrode 15 and the source bus 19 through the semiconductor layer 22. The gate electrode 24 is connected at one end to the gate bus 18. The display electrode 15 and the source bus 19 thus opposed to the gate electrode 24 constitute a drain electrode 15a and a source electrode 19a, respectively. The drain and source electrodes 15a and 19a, the semiconductor layer 22, the gate insulating film 23, and the gate electrode 24 make up the thin film transistor 16. The gate electrode 24 and the gate bus 18 are simultaneously formed of, for instance, aluminum (Al). The drain and source electrodes 15a and 19a are covered with ohmic contact layers 25 and 26, which are n+-type layers, for example.

The display electrodes 15 are each connected via the associated thin film transistor 16 to the source and gate buses 18 and 19, and hence is switched between display and non-display states in dependence on the ON and OFF states of the thin film transistor 16.

The source and gate buses 19 and 18 may sometimes be broken in the course of manufacture. If a bus line is broken, no drive signal is applied to the isolated segment of the line and pixels connected to that segment cannot be driven.

To avoid the above shortcoming of the prior art, it has been proposed to employ, for example, a display structure in which spare bus lines for repair use are provided at terminating ends of the gate and source buses 18 and 19 as disclosed in Donald E. Castleberry et al, "A 1 Mega-Pixel Color a-Si TFT Liquid-Crystal Display," SID INTERNATIONAL SYMPOSIUM, DIGEST OF TECHNICAL PAPERS, Vol. XIX, May, 1988. According to this structure, if a bus line is open, the corresponding spare bus line is connected to the open end segment by laser welding so that drive signals are applied to the two line segments separated by breakage from the input terminal and the spare bus line, respectively, thereby improving yield. With this method, however, if a bus line is open at two or more places, the line segment open at both ends cannot be repaired.

According to the above conventional structure, the spare bus lines for repairing the gate and source buses 18 and 19 are provided at the side of their terminating ends, that is, at the side opposite from their input terminals. Consequently, this prior art structure is defective in that the areas for the spare bus lines, which are not related to the display operation, must be secured on the transparent base plate 11.

SUMMARY OF THE INVENTION

It is therefore an object of the present invention to provide a liquid crystal display device which permits repairing breakage of bus lines without the necessity of providing on the base plate large areas for spare bus lines for repair use.

According to the present invention, a repair conductive layer is provided opposite each of the source buses and/or gate buses across an insulating layer. When a bus is broken, the repair conductive layer is connected to the broken line portion for repairing it.

Accordingly, the present invention precludes the necessity of providing spare bus lines for repair use on the transparent base plate, and hence affords reduction of the area of a portion which does not participate in the display operation. Besides, the present invention permits also repairing of a bus line broken at two or

DESCRIPTION OF THE PREFERRED EMBODIMENTS

Figure 1:
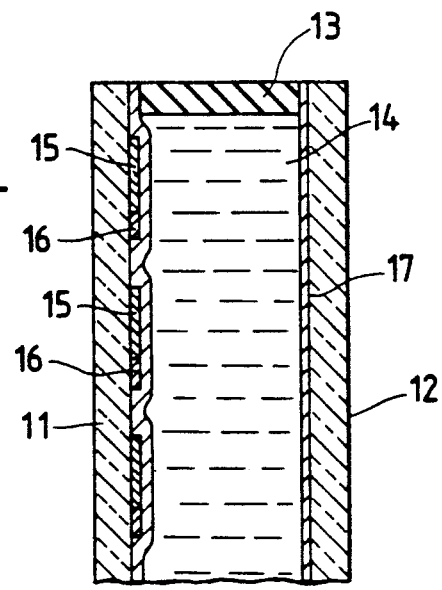
FIG. 1 is a sectional view for explaining the prior art.
Figure 2:
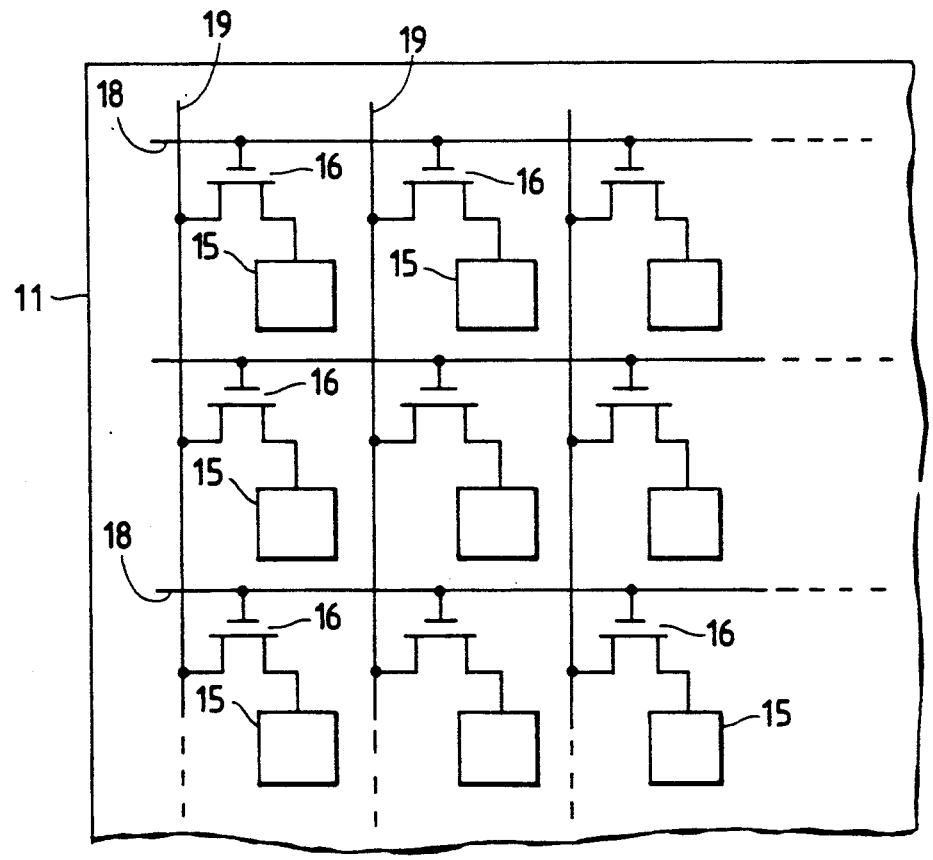
FIG. 2 is a partial plan view of a conventional liquid crystal display device, for explaining its construction.
Figure 3:
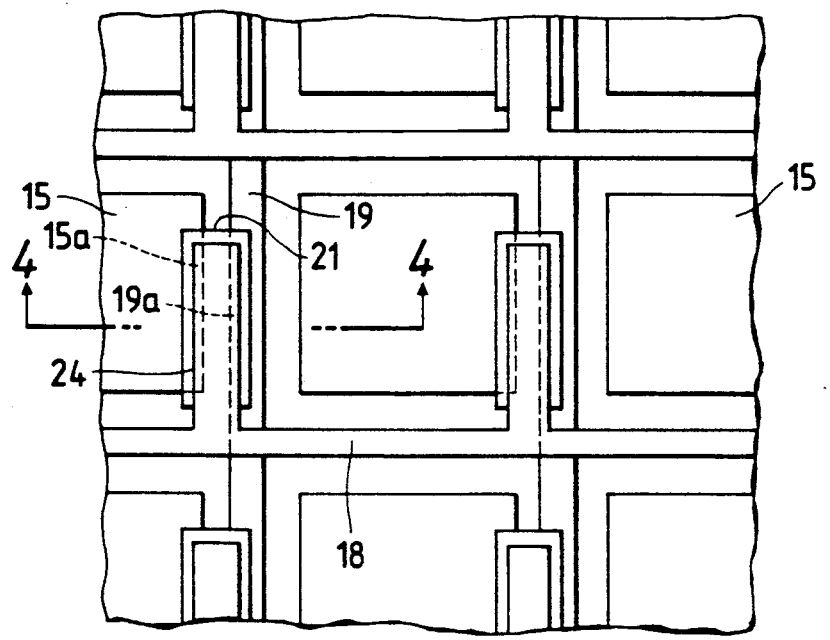
FIG. 3 is an enlarged plan view for explaining the construction of the conventional liquid crystal display device.
Figure 4:
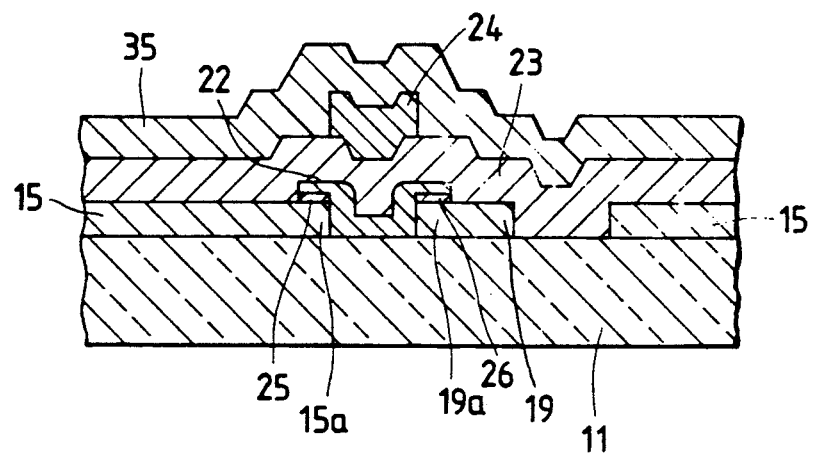
FIG. 4 is a sectional view for explaining the construction of the conventional liquid crystal display device.

A description will be given, with reference to FIGS. 5, 6A and 6B, of an embodiment of the present invention, in which the parts corresponding to those in FIGS. 1 through 4 are identified by the same reference numerals. The present invention has its feature in that repair conductive layer segments 41 are deposited on an insulating layer 23 overlying a chromium or similar refractory metal layer which forms the source buses 19.

Figure 5:
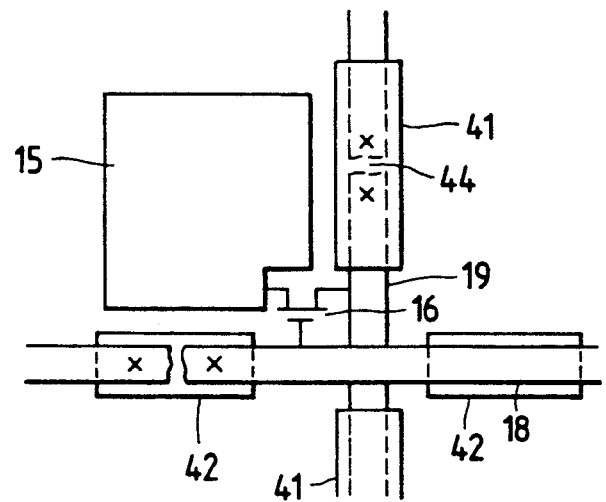
FIG. 5 is a plan view illustrating an embodiment of the present invention.
Figure 6A:
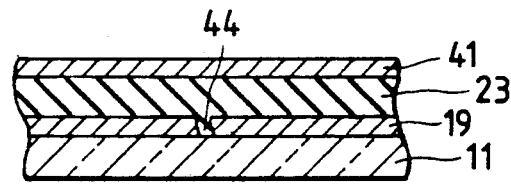
FIGS. 6A and 6B are sectional views for explaining the principal part of the present invention.
Figure 6B:
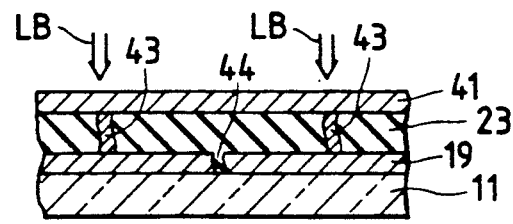

In this embodiment the repair conductive layer segments 41 are deposited in the form of line segments on the insulating layer 23 and extend above each pair of source bus 19 lengthwise thereof between each adjacent gate buses 18 as shown in FIGS. 5, 6A and 6B. The insulating layer 23 is deposited almost all over the top surface of the transparent base plate 11 and serves as a common gate insulating film for the thin film transistors 16. The repair conductive layer segments 41 can be formed of aluminum at the same time as the source buses 19 are deposited, for example. The repair conductive layer segments 41 are formed along each source bus 19 except at places where the gate and source buses 18 and 19 cross each other as depicted in FIG. 5.

In case the source bus 19 is broken as indicated by 44 in FIG. 6A, laser beams LB are applied by a laser welder (a welder utilizing laser beams) to a repair conductive layer segment 41 from above at positions (indicated by crosses in FIG. 5) on both sides of the broken portion of the source bus 19, by which the insulating layer 23 is destroyed, and consequently, the repair conductive layer segment 41 and the source bus 19 can be electrically interconnected by molten metal as indicated by 43 in FIG. 6B.

Similar repair conductive layer segments 42 for each gate bus 18 may also be formed of the same refractory metal layer as that of the source bus 19 in the same plane as that of the latter in opposing relation to the gate bus 18 across the insulating layer 23 as shown in FIG. 5. In this instance, each repair conductive layer segment 42 extends between two adjacent source buses 19.

Figure 7:
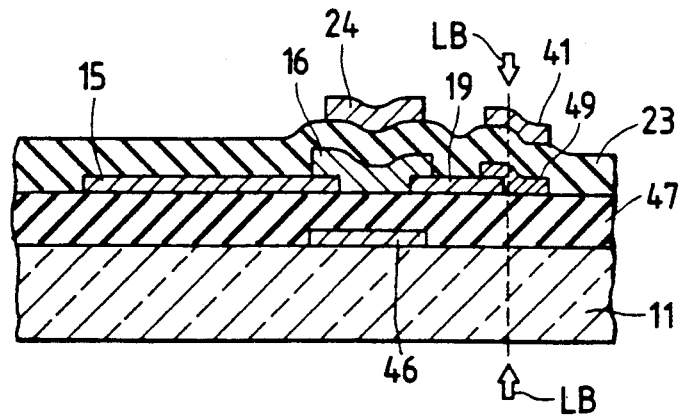
FIGS. 7 through 10 are sectional views illustrating modified forms of the present invention.
Figure 8:
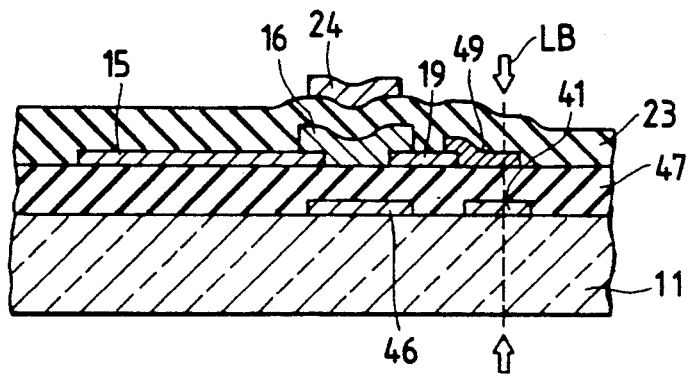
Figure 9:
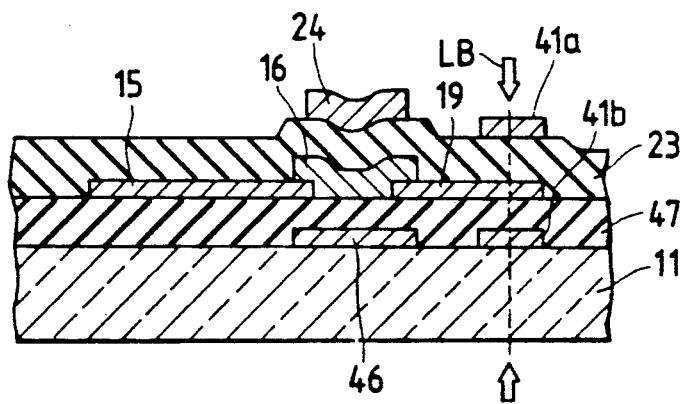

FIGS. 7 through 9 illustrate modified forms of the present invention. These modifications are common in that the display electrodes 15, the source buses 19 and the thin film transistors 16 are formed on an undercoat insulating layer 47 deposited over substantially the entire surface area of the transparent base plate 11, a conductive layer pad 46 as of chromium is provided between the transparent base plate 11 and the undercoat insulating layer 47 at a position corresponding to each thin film transistor 16 to prevent it from direct exposure to external light and hence prevent it from malfunction by the external light, and a transparent conductive layer is used as at least one part of each source bus 19. The insulating layer 23 is formed of, for instance, silicon nitride and formed by extending the gate insulating film of the thin film transistors 16 as in the above-described embodiment.

In the embodiment shown in FIG. 7 a metal bus line 49, formed by a refractory metal layer as of chromium, is provided so that its one marginal portion covers one marginal portion or the entire surface of each source bus 19 formed by the transparent conductive layer, and the metal bus line 49 and the transparent conductive layer constitute the source bus 19. When the bus line 19 is broken, the metal bus line 49 and the repair conductive layer segment 41 deposited on the second insulating layer 23 are fusion-welded by the laser beam LB for electrical connection to repair the open line. The laser beam LB may be applied either from the underside of the base plate 11 or from the opposite direction. The repair conductive layer segments 41 are deposited using the same aluminum as that forming the gate electrodes 24 and the gate buses 18.

ITO (an indium-tin oxide) used for the transparent conductive layer forming the source bus 19 contains mobile oxygen, which, when contacting the aluminum, readily combines with it in the interface therebetween. Consequently, an aluminum-oxygen combined layer is formed in their interface. If a repair conductive layer segment 41 of aluminum and the source bus 19 of ITO are directly interconnected, the aluminum-oxygen combined layer is formed in their fusion-welded portion and the resistance value of this portion gradually increases (which resistance value increases upon heat treatment), with the result that the repair conductive layer segment does not work well.

To avoid this, in the FIG. 7 embodiment the metal bus line 49, which is a chromium, nickel, nichrome, molybdenum, tantalum, molybdenum-tantalum alloy, or similar refractory metal layer, is deposited overlapping one marginal portion of the transparent ITO conductive layer which forms each source bus 19, and the repair conductive layer segments 41 of aluminum are deposited opposite the metal bus line 49 across the insulating layer 23 in the same manner as described above with regard to FIG. 5. With such a structure, when the source bus 19 is broken, a repair conductive layer segment 41 and the metal bus line 49 can be fusion-welded by the laser beam at two positions on both sides of the broken portion. It has been ascertained by the present inventors that the oxygen in the ITO is more stable than in the case when it combines with the above-mentioned refractory metals, and consequently, the contact resistance of the ITO and such refractory metal is low and stable.

In the FIG. 8 embodiment the repair conductive layer lines 41 are formed of the same material as that of the light blocking metal layer pads 46 on the transparent base plate 11 to extend under corresponding refractory metal bus lines 49 formed on the undercoat insulating layer 47 in contact with the transparent ITO conductive layers which form the source buses 19. The repair conductive layer line 41 and the metal bus line 49 can be fusion-welded by the laser beam LB.

It is evident, in either of the FIGS. 7 and 8 embodiments, that the repair conductive layer segments 42 for the gate buses 18, shown in FIG. 5, and the metal bus lines 49 can be simultaneously formed of the same refractory metal in the same plane.

The FIG. 9 embodiment has a structure in which repair conductive layer segments 41a and repair conductive layer line 41b are formed on the top of the insulating layer 23 and under the undercoat insulating layer 47 in opposing relation to the transparent ITO conductive layer which forms the source bus 19. The repair conductive layer lines 41b in the bottom of the undercoat insulating layer 47, that is, on the top surface of the transparent base plate 11 are formed of the refractory metal at the same time as the light blocking metal layer pads 46. In the FIG. 9 embodiment, when irradiated by the laser beam LB, the insulating layers 23 and 47 and the transparent conductive layer 19 are fused at the laser irradiated position to make a hole therethrough, through which the repair conductive layer 41b of the refractory metal contacts the transparent conductive layer 19 and, at the same time, is welded to the repair conductive layer 41a of aluminum.

Figure 10:
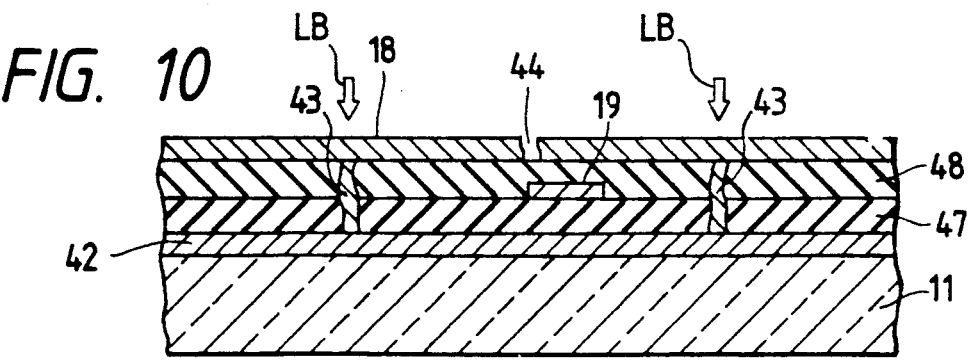

FIG. 10 illustrates a structure for repairing an open line of the gate bus 18. Reference numeral 42 indicates a repair conductive layer for the gate bus 18. In this example the repair conductive layer line 42 of the same refractory metal as that of the light blocking conductive layer pads 46 is deposited opposite each gate bus 18 on the transparent base plate 11. It is also possible, in this embodiment, to employ a structure in which the refractory metal bus 49 is deposited in contact with the source bus 19 and the repair conductive layer segments 41 for the source bus 19 are formed of aluminum on the insulating layer 23 in opposing relation to the refractory metal bus 49 as shown in FIG. 7.

As described above, according to the present invention, when any one of the source and gate buses 19 and 18 is broken, the repair conductive layer 41 or 42 can be electrically connected by laser welding or the like to the bus at both sides of the broken portion, because the repair conductive layers 41 and 42 are provided opposite the source and gate buses 19 and 18. As will be appreciated from the above, the structures according to the present invention preclude the necessity of providing on the transparent base plate 11 areas for open line repair wiring patterns, and hence improve the ratio of the effective display area on the transparent base plate 11.

Moreover, according to the present invention, the repair conductive layers 41 and 42 can be deposited simultaneously with the deposition of the gate buses 18 or the light blocking conductive layer pads 46, since the repair conductive layers 41 and 42 are formed using the same material as that of the gate buses 18 or the light blocking conductive layer pads 46. Thus the repair conductive layers 41 and 42 can be provided without increasing the number of manufacturing steps and hence without increasing the manufacturing costs. Besides, according to the present invention, even if the same bus line is broken at two or more places, they can be repaired. The present invention improves yield and hence affords significant reduction of manufacturing costs.

It will be apparent that many modifications and variations may be effected without departing from the scope of the novel concepts of the present invention.

What is claimed is:

1. A liquid crystal display device in which a plurality of parallel buses and a plurality of parallel gate buses perpendicular thereto are formed in different planes, respectively, on one surface of a transparent base plate, thin film transistors are provided at intersections of said source and gate buses, and a picture element area of liquid crystal opposite each of a plurality of display electrodes formed in a matrix array in the plane in which said source buses are provided is driven by ON-OFF control of said thin film transistors;
    an insulating layer formed at one side of each of said source buses in direct contact therewith; and
    a metallic source bus repair conductive layer formed opposite said each source bus across said insulating layer in direct contact therewith and extending along at least each sectional portion of the source bus defined between two adjacent ones of said gate buses.

2. The liquid crystal display device of claim 1 wherein said insulating layer is formed to extend over substantially the entire area of said one surface of said transparent base plate between the different planes in which said source buses and said gate buses are respectively formed, said insulating layer constituting a gate insulating film of each of said thin film transistors, and said source bus repair conductive layer being formed on said insulating layer at the same side of said insulating layer on which said gate buses are formed.

3. The liquid crystal display device of claim 2 wherein each said source bus is formed by a narrow transparent conductive layer and a metal bus line of a refractory metal extending along one side of said narrow transparent conductive layer, with their marginal portions overlapping each other, and said source bus repair conductive layer is formed of the same metallic material as that of said gate buses and are opposite said metal bus line of each said source bus across said insulating layer.

4. The liquid crystal display device of claim 1, 2, or 3 wherein a gate bus repair conductive layer is formed and extends between two adjacent ones of said source buses in opposing relation to each of said gate buses across said insulating layer.

5. The liquid crystal display device of claim 1 wherein said insulating layer is formed between said source buses and said transparent base plate almost all over said one surface of said transparent base plate, and a light blocking layer and each of said source bus repair conductive layer are formed of the same refractory metal between said insulating layer and said transparent base plate in opposing relation to each of said thin film transistors.

6. The liquid crystal display device of claim 5 wherein each of said source buses is formed by a narrow transparent conductive layer and a metal bus line of a refractory metal extending along one side of said narrow transparent conductive layer, with their marginal portions overlapping each other, and said source bus repair conductive layer is formed opposite said metal bus line across said insulating layer and extends along said metal bus line.

7. The liquid crystal display device of claim 6 wherein a gate bus repair conductive layer extending along said each gate bus in opposing relation thereto is formed of said refractory metal in the same plane in which said metal bus line is formed.

8. The liquid crystal display device of claim 7 wherein said gate insulating film of said thin film transistors is formed between the planes of said source buses and said gate buses almost all over said one surface of said transparent base plate.

9. The liquid crystal display device of claim 5 wherein said gate insulating film of said thin film transistors is formed between said source buses and the array of said display electrodes almost all over said one surface of said transparent base plate, and said gate buses are formed on said gate insulating film.

10. The liquid crystal display device of claim 9 wherein another source bus repair conductive layer is formed of the same material as that of said gate buses on said gate insulating film in opposing relation to each of said source buses.

11. The liquid crystal display device of claim 1, 2, or 3 wherein said source bus repair conductive layers are formed of aluminum.

12. A liquid crystal display device comprising a plurality of parallel source buses and a plurality of parallel gate buses perpendicular thereto formed in one and another plane, respectively, on one surface of a transparent base plate, a plurality of thin film transistors each having a gate insulating film provided at intersections of said source and gate buses, a picture element area of liquid crystal opposite each of a plurality of display electrodes formed in a matrix in said one plane in which said source buses are provided being driven by ON-OFF control of said thin film transistors, the said gate insulating film of each of said thin film transistors comprising a portion of a common first insulating layer formed on said array of said display electrodes and said source buses to extend almost all over said one surface of said transparent base plate, and said gate buses being formed on said first insulating film in direct contact therewith, said display device further comprising:

a second insulating layer formed between said transparent base plate and an array of said source buses, said display electrodes and said thin film transistors almost all over said base plate;

a light blocking metal layer formed opposite each of said thin film transistors across said second insulating layer in direct contact therewith; and a gate bus repair conductive layer formed of the same material as that of said light blocking metal layer in direct contact with said second insulating layer in opposing relation to each of said gate buses across said first and second insulating layers.

* * * * *